(12) United States Patent
Coon et al.

(10) Patent No.: US 9,043,421 B1
(45) Date of Patent: May 26, 2015

(54) MONITORING AND SHARING DATA AMONG SERVER GROUPS

(71) Applicant: Amazon Technologies, Inc., Reno, NV (US)

(72) Inventors: Aaron Joseph Coon, Bellevue, WA (US); Michael David Marr, Monroe, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 264 days.

(21) Appl. No.: 13/839,428

(22) Filed: Mar. 15, 2013

(51) Int. Cl.
*G06F 15/16* (2006.01)
*H04L 12/58* (2006.01)

(52) U.S. Cl.
CPC ...................................... *H04L 51/30* (2013.01)

(58) Field of Classification Search
USPC ......... 709/200–206, 224, 217, 232, 252, 228, 709/229, 223
See application file for complete search history.

(56) References Cited

U.S. PATENT DOCUMENTS

| | | | |
|---|---|---|---|
| 7,849,138 B2 * | 12/2010 | Gu et al. ........................ | 709/205 |
| 2003/0083977 A1 * | 5/2003 | Syed ................................ | 705/37 |
| 2010/0121522 A1 * | 5/2010 | Wolfson et al. .................. | 701/33 |
| 2012/0226797 A1 * | 9/2012 | Ghosh et al. .................. | 709/224 |

* cited by examiner

*Primary Examiner* — Jude Jean Gilles
(74) *Attorney, Agent, or Firm* — Novak Druce Connolly Bove + Quigg LLP (57) ABSTRACT

Each server in a server group of a data center can run a data collection agent. The agent can collect data from a respective server in the server group. The data can include a performance characteristic (i.e., performance data) associated with the respective server. If the performance characteristic falls outside an allowable range, the agent can broadcast this information to other agents at other servers in the server group. If the other agents at the other servers in the server group detect a similar performance characteristic outside the allowable range, they can broadcast as well. If there is a sufficiently high quantity of broadcasts, then that can indicate a high likelihood that there is a potential problem with respect to servers in the server group. The problem can be reported to the central controller, which can then handle the problem appropriately (e.g., issue an alarm, contact support technician, etc.).

25 Claims, 8 Drawing Sheets

MONITORING AND SHARING DATA AMONG SERVER GROUPS

BACKGROUND

Computing devices and computing platforms in networked environments are becoming more commonplace, are being used for a wider variety of purposes, and have an increasing amount of functionality. In some cases, businesses can provide computing platforms in networked environments to satisfy their customers' computing needs. For example, a customer can utilize computing resources, such as servers, in a networked data center environment provided by a business. In the example, the customer can be an enterprise and can provide applications for the customer's own end users, where the applications are hosted on the servers in the data center. As such, the data center provides and maintains its servers, which are used to run applications and provide services. It follows that ensuring the reliability of the servers' performance is very important. However, in some cases, constant monitoring and maintenance of the servers can be impractical or infeasible. In other words, ensuring the reliability of the servers can sometimes be difficult, inconvenient, and/or costly, and can thereby reduce the overall experience associated with using the servers in the data center.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to running a data center. In particular, various embodiments of the present disclosure enable servers belonging to a server group in a data center to communicate amongst themselves to determine whether or not a problem likely exists with respect to one or more servers in the server group.

In some embodiments, a data center environment can include a plurality of servers and a central controller (i.e., data aggregation system) connected via a network infrastructure. Each of the servers can belong to a server group. In some embodiments, server groups can be defined by a common property shared among its member servers. For example, servers in the same local subnet can belong to the same server group. In another example, servers on the same server rack or adjacent server racks can belong to the same server group.

Each of the servers in a server group can run a data collection agent. The agent can collect data from a respective server in the server group, the data including at least one performance characteristic (i.e., performance data) associated with the respective server. In one example, each agent can collect a temperature measurement for a hard drive of the respective server. If the temperature measurement for the hard drive on the respective server exceeds an allowable temperature threshold, then there can be a potential overheating problem associated with (the hard drive of) the respective server. The agent can broadcast the overly high temperature to other agents (on other servers) in the server group. If the other agents at the other servers in the server group detect a similar potential overheating problem, they can broadcast their temperatures as well. If there is a sufficiently high quantity of broadcasts, then that can indicate a high likelihood that the potential overheating problem is actually occurring with respect to servers in the server group. The problem can be reported to the central controller, which can then handle the problem appropriately (e.g., issue an alarm, contact support technician, etc.).

Various other functions and advantages are described and suggested below as may be provided in accordance with the various embodiments.

Figure 1:
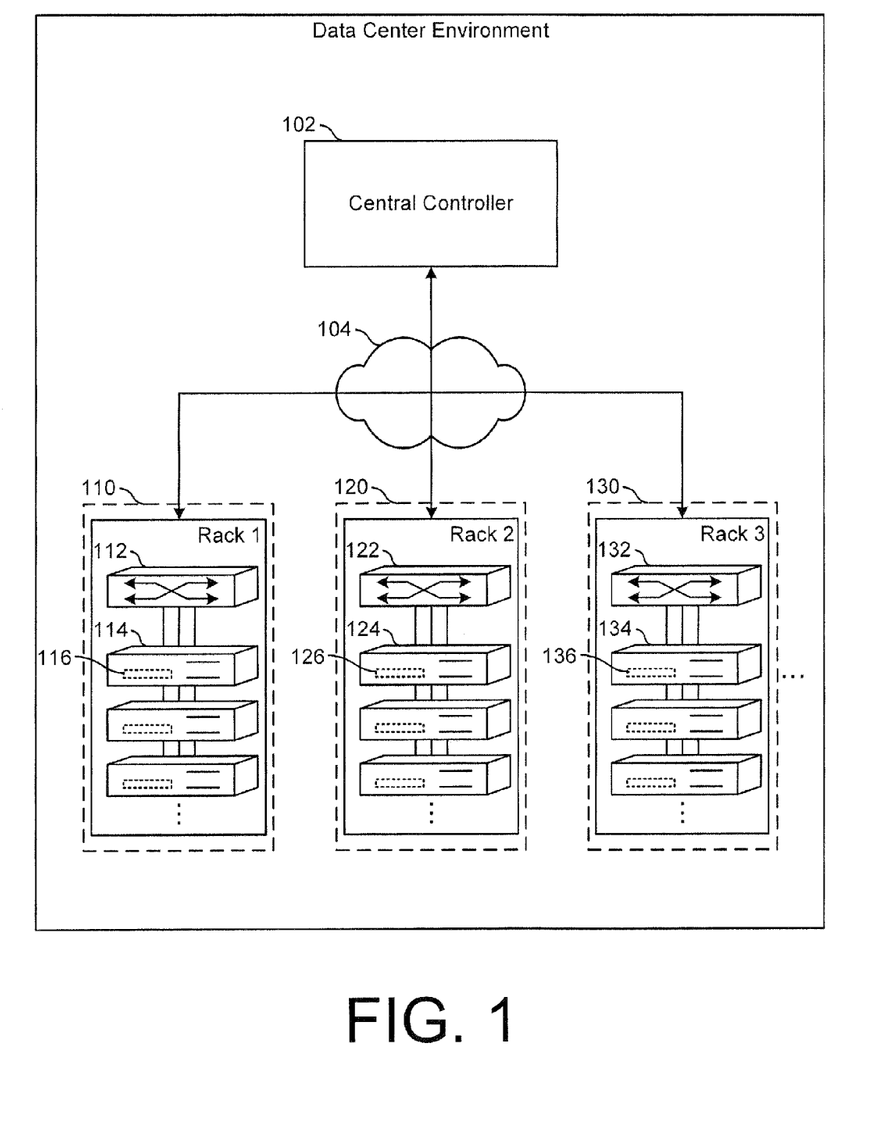
FIG. 1 illustrates an example environment in which aspects of the various embodiments can be utilized.

FIG. 1 illustrates an example environment 100 in which aspects of the various embodiments can be utilized. The example environment 100 can be at least one data center environment, computer center environment, or other similar environment for accommodating computing devices, computing systems, servers, storage devices, and/or other related components. The example environment 100 can include a central controller 102, a network 104, and one or more server groups (e.g., 110, 120, 130, etc.). The central controller (i.e., central processing system, centralized service, central control plane, data aggregation system, data collection system, etc.) 102 can be a component in the example data center environment 100. The central controller 102 can provide a point of contact, processing, and/or management for monitoring and sharing data throughout the example environment 100. In some embodiments, the central controller 102 can be a service distributed among various network components.

The network 104 can be a collection of computing devices, computing systems, and hardware and/or software components that are interconnected by communication channels that allow the sharing of resources and information. The network 104 can provide the infrastructure for communications among various components associated with the network 104. For example, the network 104 can be the Internet, an (e.g., internal) intranet, LAN, WLAN, etc. As shown in FIG. 1, the network 104 can provide the interconnectivity among the central controller 102 and various servers in the server groups (e.g., 110, 120, 130, etc.).

In some embodiments, each of the server groups (e.g., 110, 120, 130, etc.) can be formed based on a common property or trait shared by all the servers that are members of a respective server group. The common property can include (but is not limited to) the servers being in the same local subnet, being physically located on the same server rack, being physically located within an allowable physical distance, being logically located within an allowable network distance (e.g., logical hop distance), being of the same server model, being of the same server brand (e.g., distributor), being from the same vendor (e.g., manufacturer), having a common hardware component model (e.g., model of hard disk/drive), having a common hardware component type (i.e., class of hardware component), having a common hardware component manufacturer, being positioned at a particular location on a server rack (e.g., top level servers, bottom level servers, first server on third row of server racks, etc.), being associated with the same power domain (e.g., a grouping in which members are connected to a particular power source(s), a grouping in which members are connected to a particular electrical path, etc.), being associated with a particular customer account, being associated with a particular workload (e.g., usage, application, service, etc.), or being associated with a particular user defined property.

In one example, a server group can include all the servers in the same subnet (i.e., local subnet). Depending on how the network is or had been configured, servers in the same subnet can belong to the same server group. Some advantages of allowing subnets to act as server groups include ease of use and convenience, because the network infrastructure can be already configured and set up with certain servers belonging to certain local subnets. In another example, servers belonging to a particular server group can include all the servers that are physically located on a particular server rack in the data center. In some embodiments, as shown in FIG. 1, each server group can be set as a subnet that also corresponds to a respective physical server rack (e.g., server groups 110, 120, and 130 correspond to "Rack 1", "Rack 2", and "Rack 3", respectively).

In some embodiments, each server group can include a switch. Furthermore, each server group can include and one or more servers. For example, in FIG. 1, server group 110 corresponding to Rack 1 can include switch 112 and one or more servers (e.g., 114). Server group 120 corresponding to Rack 2 can include switch 122 and one or more servers (e.g., 124). Server group 130 can corresponding to Rack 3 and can include switch 132 and one or more servers (e.g., 134), as shown in the example data center environment of FIG. 1. In some embodiments, the switch included with each server group can be a top-of-rack (TOR) switch.

Moreover, each server can include a data collection agent (i.e., data collection module, agent). In the example of FIG. 1, server 114 can include data collection agent 116, server 124 can include data collection agent 126, and server 134 can include data collection agent 136. In some embodiments, there can be a data collection agent (e.g., 116, 126, 136, etc.) running on each server (e.g., 114, 124, 134, etc.) in the example data center environment 100. In some embodiments, each data collection agent can be configured as a software module executing on a respective server.

Each data collection agent can communicate with various components (e.g., hardware components, software components, etc.) within the respective server. The data collection agent can collect (i.e., gather, retrieve, obtain, etc.) data from the various components of the respective server. In some embodiments, the data can include one or more performance characteristics of (one or more components of) the server. The collected data can also be monitored, for example, to determine how well the respective server is performing (e.g., to detect one or more potential problems at the respective server).

Having collected the data, the data collection agent can transmit or broadcast (at least a portion of) the data collected at the respective server to other servers in the server group. The data collection agent can also be configured to receive, listen for, and/or observe (at least a portion of) data sent/broadcasted from other data collection agents at other servers within the server group. The data received from other agents at other servers can be analyzed to detect how well those other servers are performing (e.g., to detect potential problems at the other servers). The transmitting/broadcasting and receiving of the data among agents on the servers can be made possible by the network infrastructure.

In some embodiments, when the data collected at the respective server indicates a potential (e.g., possible) problem, the agent at the respective server can generate a confidence coefficient (i.e., score) for the potential problem. The confidence coefficient can indicate how likely the potential problem actually exists with respect to the respective server. Further, the confidence coefficient can be modified/adjusted when similar data is received from other agents at other servers. For example, when the agent at the respective server receives data indicating a similar potential problem(s) at another server(s), then the confidence coefficient can be increased for the potential problem at the respective server. In other words, when other servers are also experiencing similar problems, it is more likely that the respective server is also experiencing the problem.

In addition, when there is a quantity of broadcasts about potential problems that exceeds an allowable threshold and/or when the confidence coefficient(s) for a certain potential problem(s) exceeds an allowable threshold, at least some of the data collected from the server(s) indicating the potential problem(s) can be sent to the central controller 102 for processing. The central controller 102 can analyze the data and handle appropriately. In some embodiments, the central controller 102 can issue an alarm or warning. In some embodiments, the central controller 102 can pause or reduce server performance in the data center. In some embodiments, the central controller 102 can notify a data center technician or a support/maintenance department.

Figure 2:
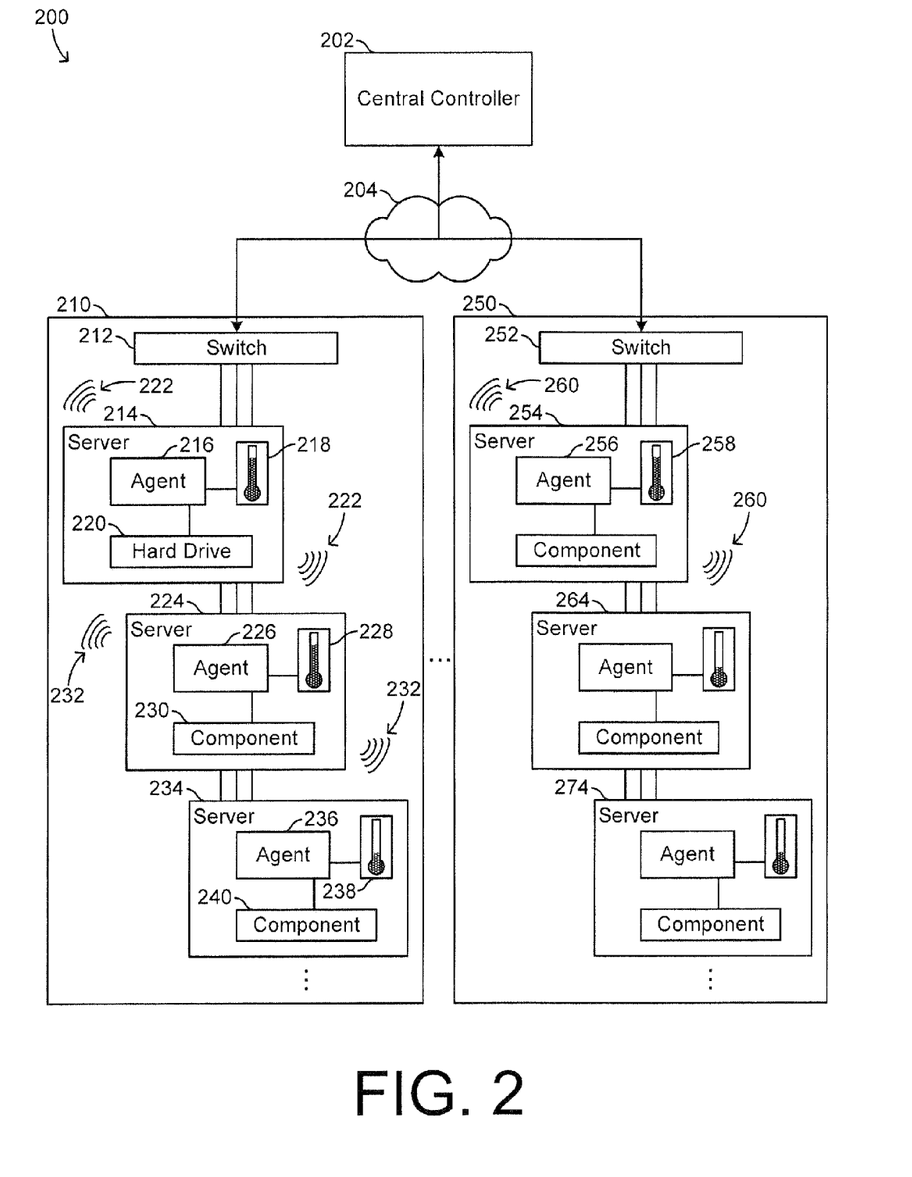
FIG. 2 illustrates an example system embodiment for monitoring and sharing data among server groups.

FIG. 2 illustrates an example system embodiment 200 for monitoring and sharing data among server groups. The example system embodiment 200 can comprise a central controller 202, a network 204, and server racks 210 and 250. In the example of FIG. 2, each of the server racks 210 and 250 can correspond to a server group. In other words, element 210 can correspond to a server rack and/or a server group. Similarly, element 250 can correspond to another server rack and/or server group. As mentioned above, each server group can be generated based on a common property shared by servers that are members of the group. In some embodiments, server groups can be based on local subnets; in other words, the servers in a particular server group are all in the same particular local subnet. In some embodiments, server groups can be based on physical colocation; in other words, the servers within a server group can be collocated on the same server rack and/or nearby server racks. In the example of FIG. 2, server group 210 is distinguishable from server group 250 by server rack as well as by subnet. In other words, server group 210 can correspond to server rack 210 as well as local subnet #1 (not illustrated in FIG. 2) while server group 250 can correspond to server rack 250 as well as local subnet #2 (not illustrated in FIG. 2).

In one example, the monitoring and sharing of data among server groups can be used to detect potential overheating problems in a data center environment (e.g., example environment 200). In this example, each agent on a respective server can gather information about the respective server and/or about a component(s) of the respective server. Data collection agent 216 on server 214 can communicate with thermistor 218, hard drive 220, and/or other components of server 214 not shown in FIG. 2. Thermistor 218 can be used to measure the temperature of the components of server 214, such as the temperature of hard drive 220. Agent 216 can communicate with various components to collect information including a performance characteristic of the server 214 and/or server components (e.g., hard drive 220).

Continuing with the example, data collection agent 216 can obtain information including an operating temperature (i.e., performance characteristic, performance data, etc.) of server 214 and can determine that the operating temperature has exceeded an allowable threshold. In some embodiments, the allowable threshold can be set as an upper bound temperature threshold, such that an operating temperature above the upper bound temperature threshold can potentially cause problems to the server 214. When the collected information including the performance characteristic (e.g., operating temperature) exceeds the allowable threshold, the agent 216 can broadcast 222 a signal indicating the performance characteristic (e.g., the overly high operating temperature) of the server 214. In some embodiments, the broadcast signal 222 can be sent from server 214 to a switch 212 (e.g., TOR switch) to be relayed to the other servers (e.g., 224, 234, etc.) in server group 210. The other servers (e.g., 224, 234, etc.) belonging to the same server group (i.e., server rack 210, local subnet #1) can listen for, receive, and/or observer the broadcast originating from server 214 (which can be relayed by switch 212).

As shown in FIG. 2, server 224 can include a data collection agent 226, as well as other server components, such as thermistor 228 and component 230. Agent 226 of server 224 can communicate with various components of server 224 and detect that thermistor 228 is showing an operating temperature (i.e., performance characteristic, performance data, etc.) above an allowable threshold range. Accordingly, agent 226 can also broadcast a signal 232 to the other servers in the same server group (e.g., 210), the signal 232 indicating the overly high operating temperature of server 224. Moreover, agent 226 can receive the broadcast 222 from agent 216 at server 214. Broadcast 222 indicates the overly high temperature at server 214, and as such, server 224 can determine that there is a higher likelihood that server 224 itself also has a potential overheating problem because server 214 (which is nearby and/or within an allowable physical distance with respect to server 224) is experiencing the same or a similar potential overheating problem.

In addition, the broadcast 232 from server 224 can also be received by agent 216 at server 214. Thus, agent 216 at server 214 can modify the confidence coefficient associated with its own detected potential overheating problem based on the receiving of the broadcast 232. The confidence coefficient for server 214 can be increased because it is more likely for server 214 to be experiencing a potential overheating problem if a nearby server within the same server group (e.g., server 224 in group 210) is also experiencing a similar potential overheating problem.

Server 234 in server group 210 can receive broadcasts 222 and 232 from server 214 and server 224, respectively. Agent 236 on server 234 can obtain data about various components of server 234 (e.g., thermistor 238, component 240, etc.) that include at least one performance characteristic of server 234. In this example, agent 236 communicates with thermistor 238 and determines that (the component(s) of) server 234 is operating within an allowable temperature range. As such, agent 236 does not perform a broadcast.

With reference now to server group 250 (i.e., server rack 250, local subnet #2), server 254 can include a data collection agent 256. The agent 256 can communicate with thermistor 258 to collect information and can detect a potential overheating problem. The agent 256 can broadcast 260 this information to the other servers (e.g., 264, 274, etc.) in server group 250. The other servers 264 and 274 receive the broadcast 260, but do not detect similar potential overheating problems and thus do not perform broadcasts. As such, agent 256 can elect not to increase the confidence coefficient for the detected potential overheating problem. In some embodiments, agent 256 can elect not to report the collected information about the potential overheating problem at server 254 to the central controller 202 because the potential problem is not sufficiently severe. In some embodiments, agent 256 can report the collected information about the potential overheating problem to the central controller 202.

As discussed above, in addition to the broadcasts by each data collection agent to other agents, each agent can also submit its collected data, measurements, or observations about its respective server to the central controller 202. In some embodiments, an agent can submit its collected data, measurements, or observations in accordance with a report policy implemented by its server group. Continuing with the previous example, a report policy can specify that if there is a sufficiently large amount of broadcasts indicating potential overheating problems at the servers and/or if there is a sufficiently high confidence coefficient indicating that at least one server is experiencing an overheating problem, then the agents can report the problem and the collected data to the central controller 202. In some embodiments, the policy can specify that the switch of the server group is to report the problem and the collected data to the central controller 202.

The central controller 202 can receive the report and analyze the data. The central controller 202 can compare all the data and determine an overall confidence level indicating whether or not a problem is occurring with respect to the server(s). In some embodiments, the central controller 202 can function as a first alert system. In one example, based on analyzing the data, the central controller 202 can discover an out of control thermal situation within the data center environment at a particular area in the data center, even though the area might not be explicitly monitored. If several physically nearby servers report increased temperatures, for example, then the central controller 202 can infer that the area (e.g., room, section of a room) is increasing in temperature even though the area has no explicit monitoring.

In some embodiments, the information collected at a server including a performance characteristic (i.e., performance data) is not limited to indicating a temperature measurement, but can additionally or alternatively indicate a power metric (e.g., measurement of power failure, power fluctuation, etc.), a memory failure, or another server malfunction. For example, the servers can observe various any kinds of intermittent failures in the data center, not only temperature hotspots. Other applications can include detecting unexpected and/or undesired server behavior, such as unanticipated server reboots, unexpected (e.g., unintentional, erroneous, etc.) bit flips in RAM, etc.

In addition, the present disclosure can enable data collection agents to autonomously filter information to determine the severity of detected potential problems. Servers can notify each other and share data, while avoiding an excessive flood of false positive alerts being sent to the central controller 202. In other words, nearby servers can share and observe data about detected potential problems, perform local filtering of false positives, and only report to the central controller 202 when the servers detect a sufficient severe potential problem (e.g., a broadcast amount of potential problems that exceeds an allowable threshold).

Figure 3:
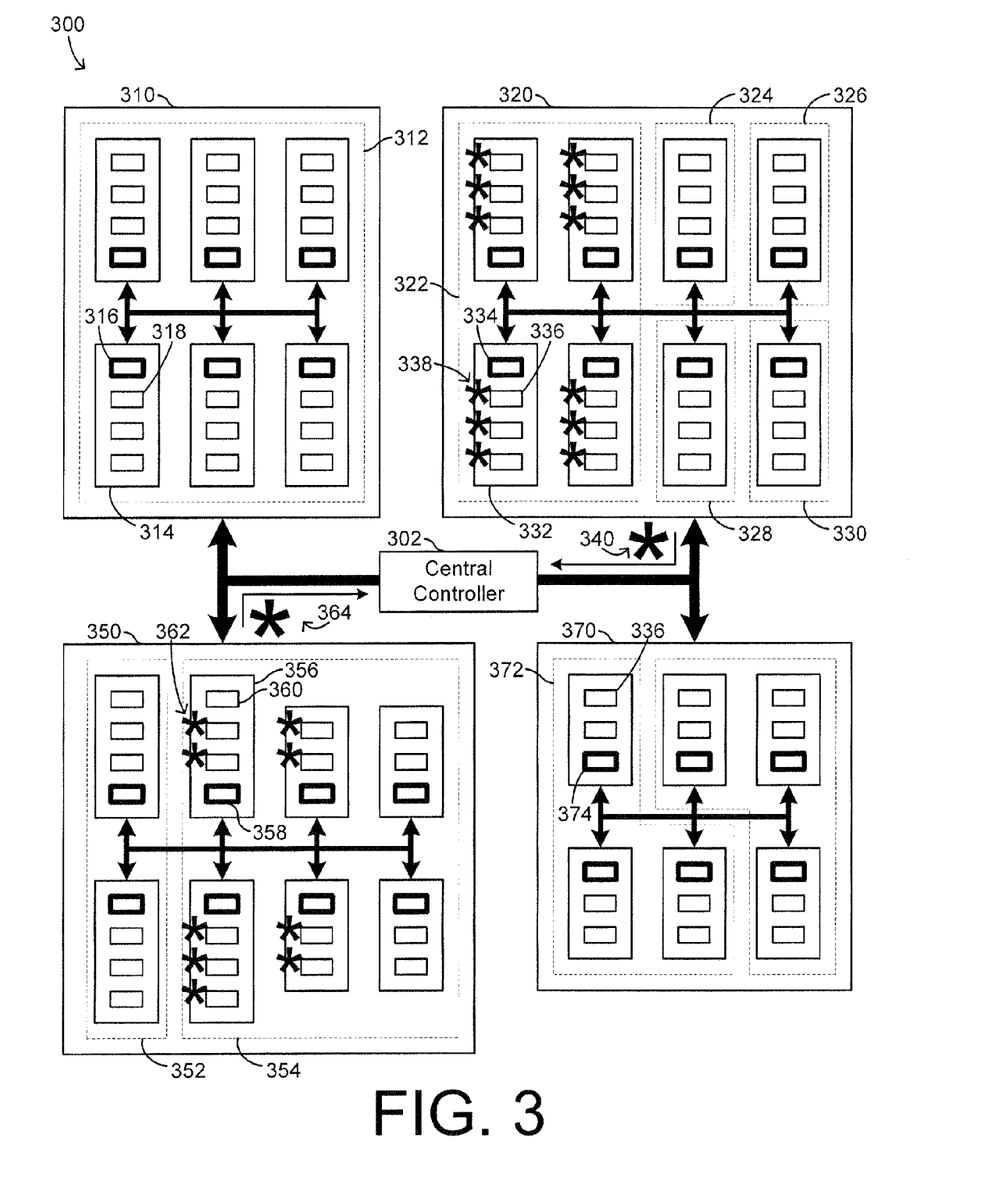
FIG. 3 illustrates an example system embodiment for monitoring and sharing data among server groups.

FIG. 3 illustrates an example system embodiment 300 for monitoring and sharing data among server groups. The example system embodiment 300 can correspond to an example data center with a central controller 302 and a plurality of rooms (e.g., 310, 320, 350, 370, etc.). Room 310 can include server group 312, which can be comprised of six server racks (e.g., 314). Each server rack can comprise a switch (e.g., 316) and at least one server 318. In FIG. 3, room 320 has eight server racks that are split into five server groups (e.g., 322, 324, 326, 328, 330). Each server rack (e.g., 332) can include a switch (e.g., 334) and at least one server (e.g., 336).

In the example of FIG. 3, all the servers in server group 322 have detected similar potential problems (denoted by asterisks "*", e.g., 338). As such, server group 322 can report 340 the potential problems to the central controller 302.

Continuing with example, in room 350, there can be two server groups 352 and 354. Group 354 has six server racks (e.g., 356), each of which has a switch (e.g., 358) and at least one server 360. Group 354 has detected potential problems (e.g., 362) on some, but not all of its servers. In this example, a report policy implemented for server group 354 can specify that as long as most of the servers detect similar potential problems, then the potential problems are to be reported. As such, group 354 can report 364 the problems to the central controller 302.

Moreover, in some embodiments, a tiered model of monitoring and sharing data can be implemented. For example, sections of a server rack can communicate with other nearby sections of the server rack. In another example, nearby TOR switches can participate in the monitoring and/or sharing of data. Multiple TOR switches can each have a data collection agent and TOR switch groups can be formed. Members of each TOR switch group can collect, share, and analyze data. In further example, rooms (e.g., 310, 320, 350, 370) can similarly participate in the monitoring and/or sharing of data. Room groups can be formed such that one room can communicate with another nearby room(s).

Figure 4:
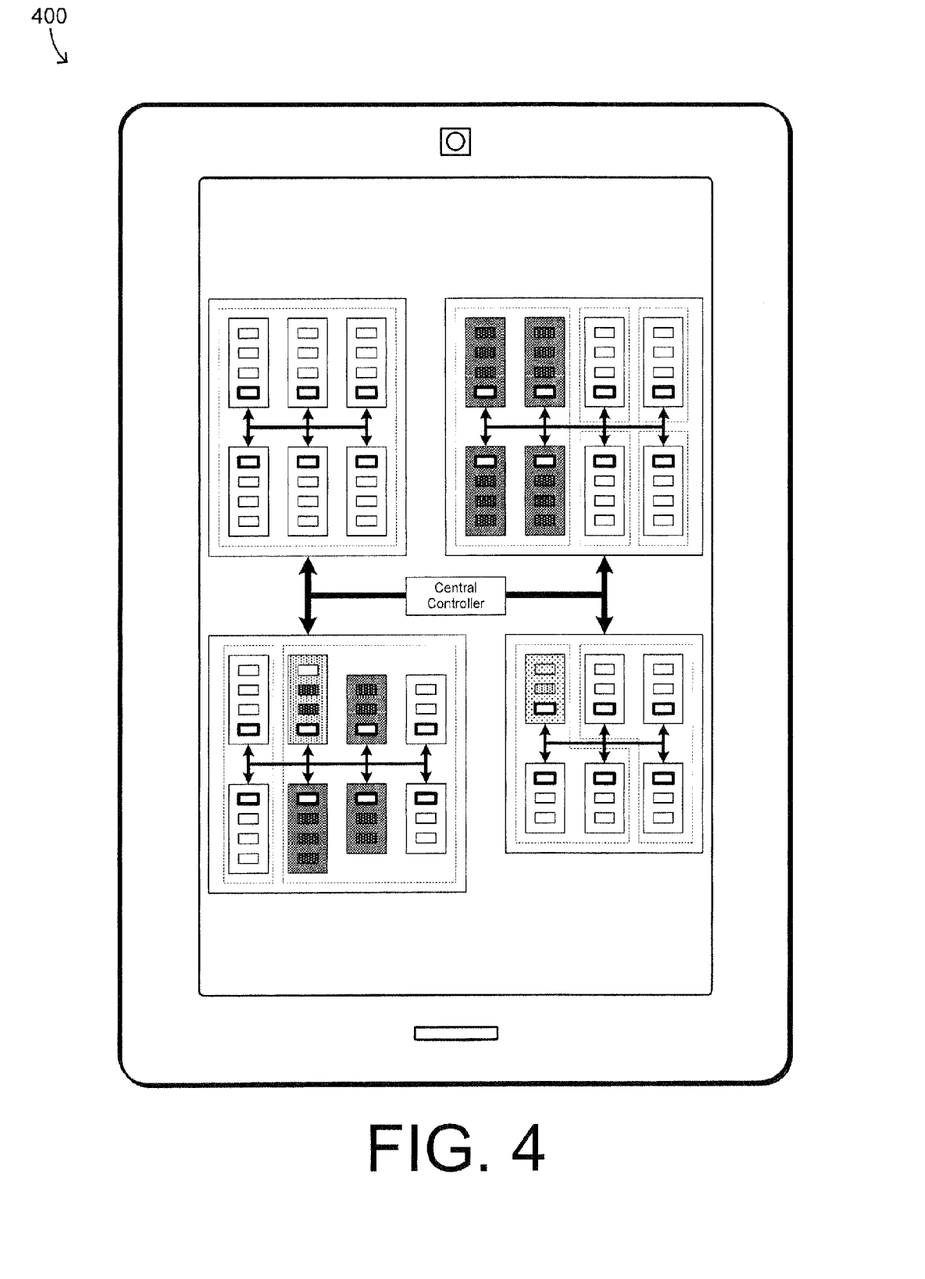
FIG. 4 illustrates an example device embodiment capable of being used with monitoring and sharing data among server groups.

FIG. 4 illustrates an example device embodiment 400 capable of being used with monitoring and sharing data among server groups. In some embodiments, a visual representation can be generated for a data center environment. FIG. 4 illustrates an example computing device embodiment 400 (see FIG. 7 and FIG. 8) that is display a visual representation generated for the example data center shown in FIG. 3. In some embodiments, the visual representation can include differences in color and/or contrast to indicate where potential problems are detected. In the example of FIG. 4, the darker colored areas correspond to where potential problems are detected. In some embodiments, the visual representation can be provided to an end user as a useful tool for quickly recognizing areas of potential problems. In some embodiments, the visual representation can also be utilized to triangulate where a potential problem source lies even if the source is not located in the network.

Figure 5:
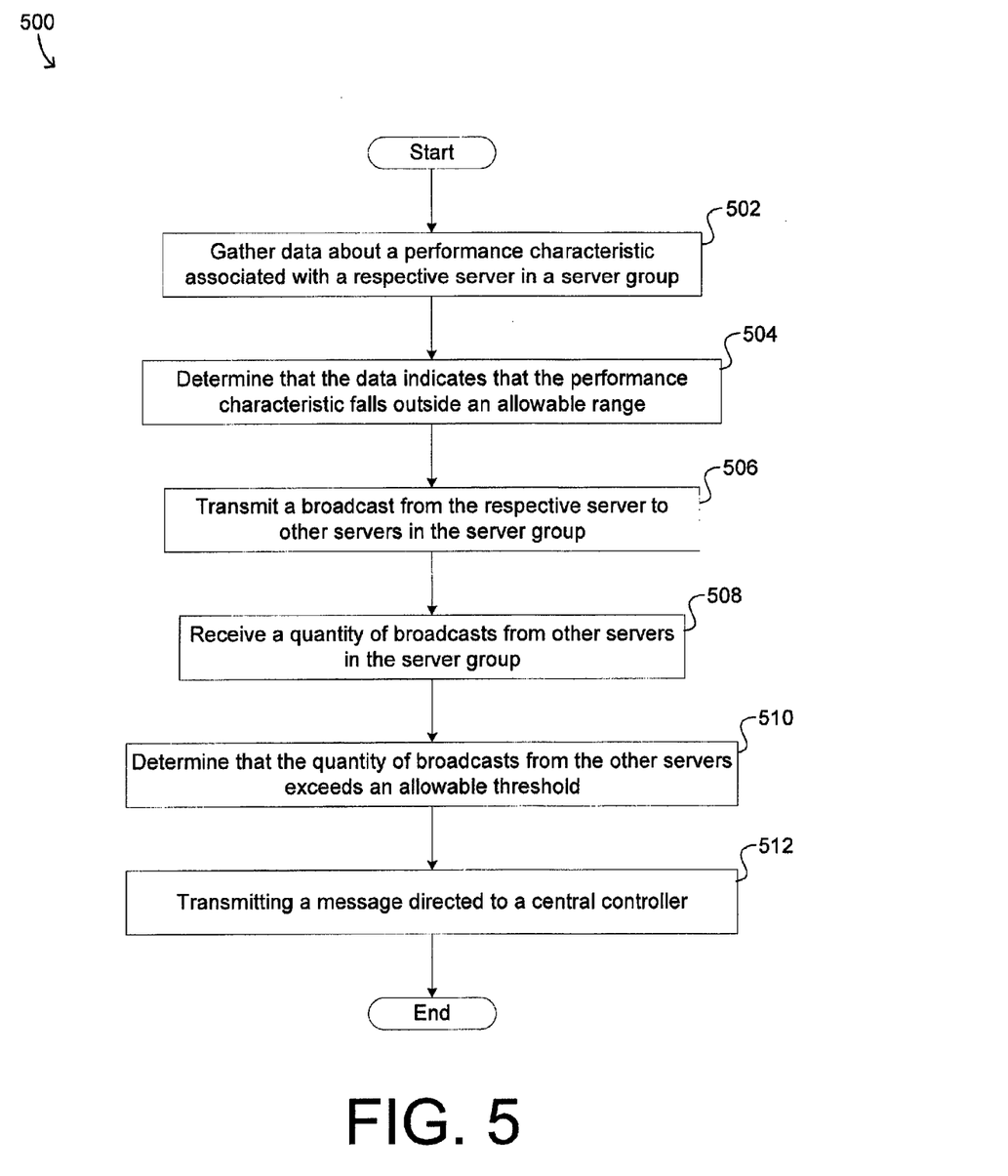
FIG. 5 illustrates an example method embodiment for monitoring and sharing data among server groups.

FIG. 5 illustrates an example method embodiment 500 for managing third party support using a networked computing system. It should be understood that there can be additional, fewer, or alternative steps performed in similar or alternative orders, or in parallel, within the scope of the various embodiments unless otherwise stated. The example method embodiment 500 can start with gathering data about at least one performance characteristic associated with a respective server in a plurality of servers in a server group, at step 502. At step 504, the method 500 can determine, at the respective server, that the data indicates that the at least one performance characteristic falls outside an allowable range. Step 506 can include transmitting a broadcast from the respective server to other servers in the plurality of servers in the server group. The broadcast can include the data about the at least one performance characteristic associated with the respective server (e.g., data indicating that the at least one performance characteristic associated with the respective server falls outside the allowable range). Step 508 can include receiving, at the respective server, a quantity of broadcasts from one or more other servers in the server group. The quantity of broadcasts can include data about at least one performance characteristic associated with the one or more other servers. The data can indicate that the at least one performance characteristic associated with the one or more other servers also falls outside the allowable range.

The method 500 can determine that the quantity of broadcasts from the one or more other servers exceeds an allowable threshold, at step 510. Then the method 500 can, at step 512, transmit a message directed to a central controller. The message can indicate a potential problem associated with at least one of the respective server or the one or more other servers in the server group.

Figure 6:
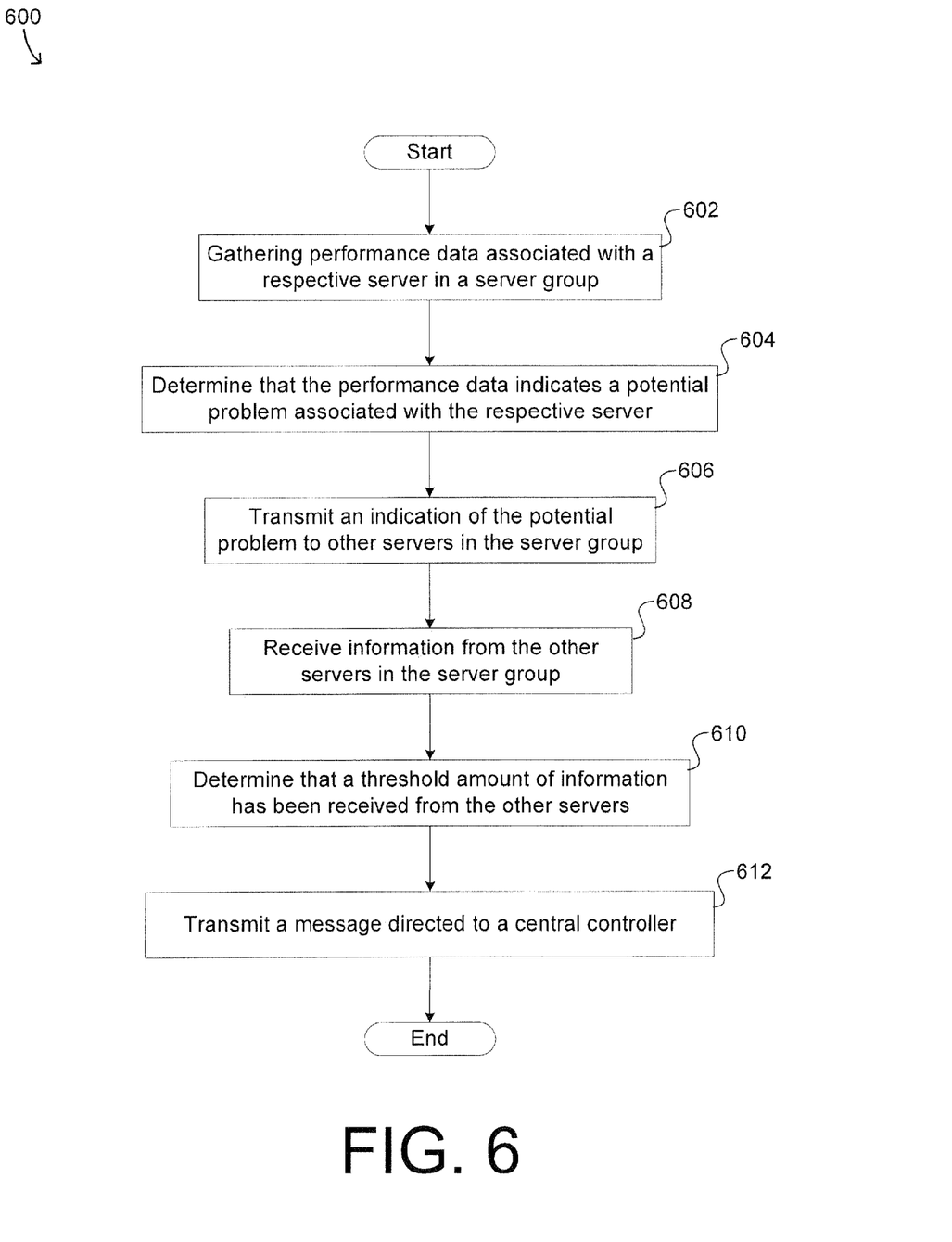
FIG. 6 illustrates an example method embodiment for monitoring and sharing data among server groups.

FIG. 6 illustrates an example method embodiment 600 for managing third party support using a networked computing system. Again, it should be understood that there can be additional, fewer, or alternative steps performed in similar or alternative orders, or in parallel, within the scope of the various embodiments unless otherwise stated. At step 602, the example method embodiment 600 can gather performance data associated with a respective server in a plurality of servers in a server group. At step 604, the method 600 can determine that the performance data indicates a potential problem associated with the respective server. Step 606 can include transmitting at least an indication of the potential problem associated with the respective server to other servers in the plurality of servers in the server group. Step 608 can include receiving, from one or more other servers in the server group, information indicating potential problems associated with the one or more other servers.

At step 610, the method 600 can determine that a threshold amount of information indicating potential problems has been received from the one or more other servers. Then at step 612, the method 600 can transmit a message directed to a central controller. The message can provide a notification of the potential problems associated with at least one of the respective server or the one or more other servers in the server group.

In some embodiments, there can also be a broadcast policy that sets a threshold for broadcast initiation. For example, the policy can specify that an agent is to send a broadcast at the first time a potential problem is detected at a server. In another example, the policy can specify the agent to send a broadcast when there has been a specified number of times the potential problem has occurred at a particular server or set of servers. Moreover, the policy can specify, for example, that a TOR switch is to send a message to an upper level module (e.g., central controller) when a specified number of servers broadcast the same or similar potential problem.

Various embodiments of the present disclosure can also implement self-diagnostic checks. In some embodiments, a server can perform a memory scan when other nearby servers have detected problems. For example, if server A hears about a problem from at least one neighboring server, then server A can perform a quick check/scan for the problem. If server A hears about the problem from X number of nearby servers, then server A can perform a deeper scan. If server A hears about the problem from all other servers in its server group, then server A can perform a comprehensive diagnostic check/scan (e.g., deep memory scan).

Figure 7:
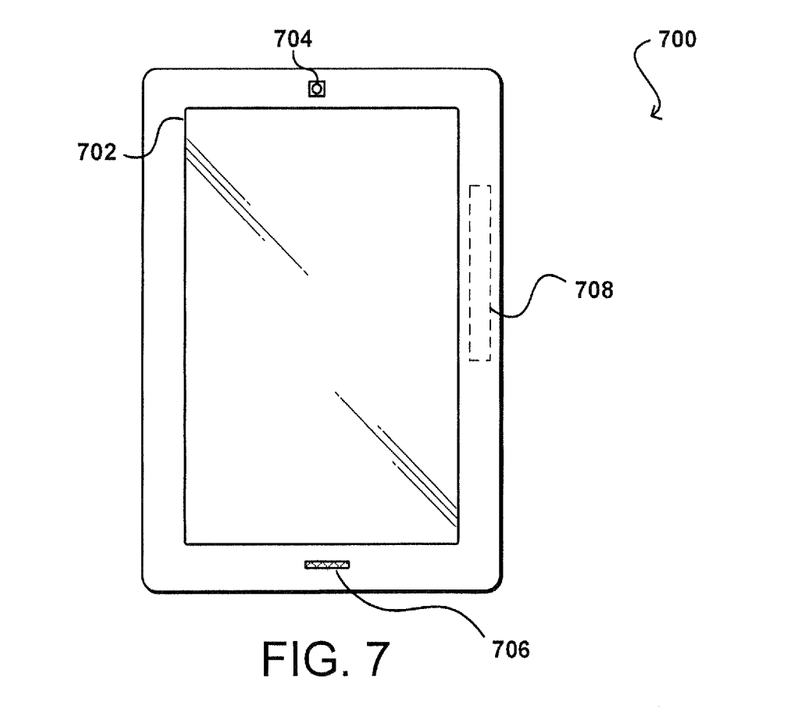
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers.

In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
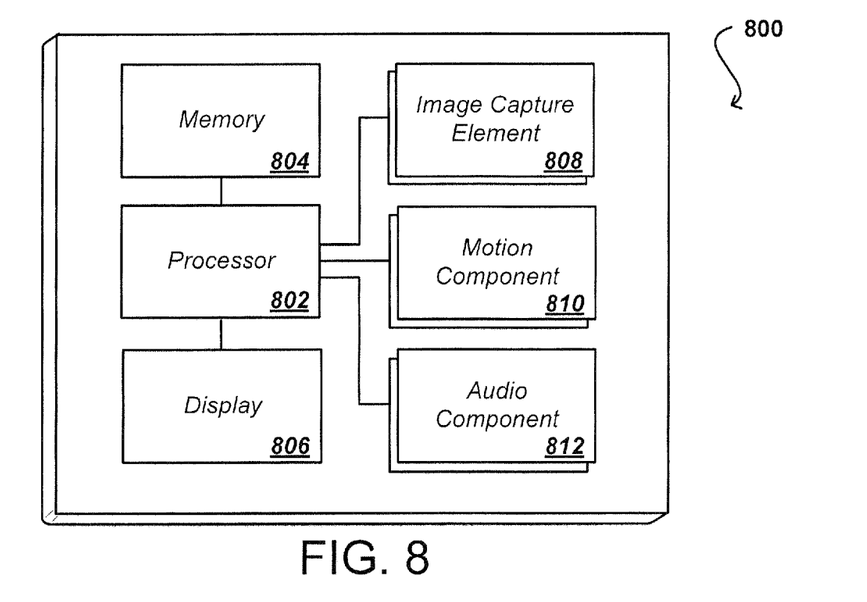
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
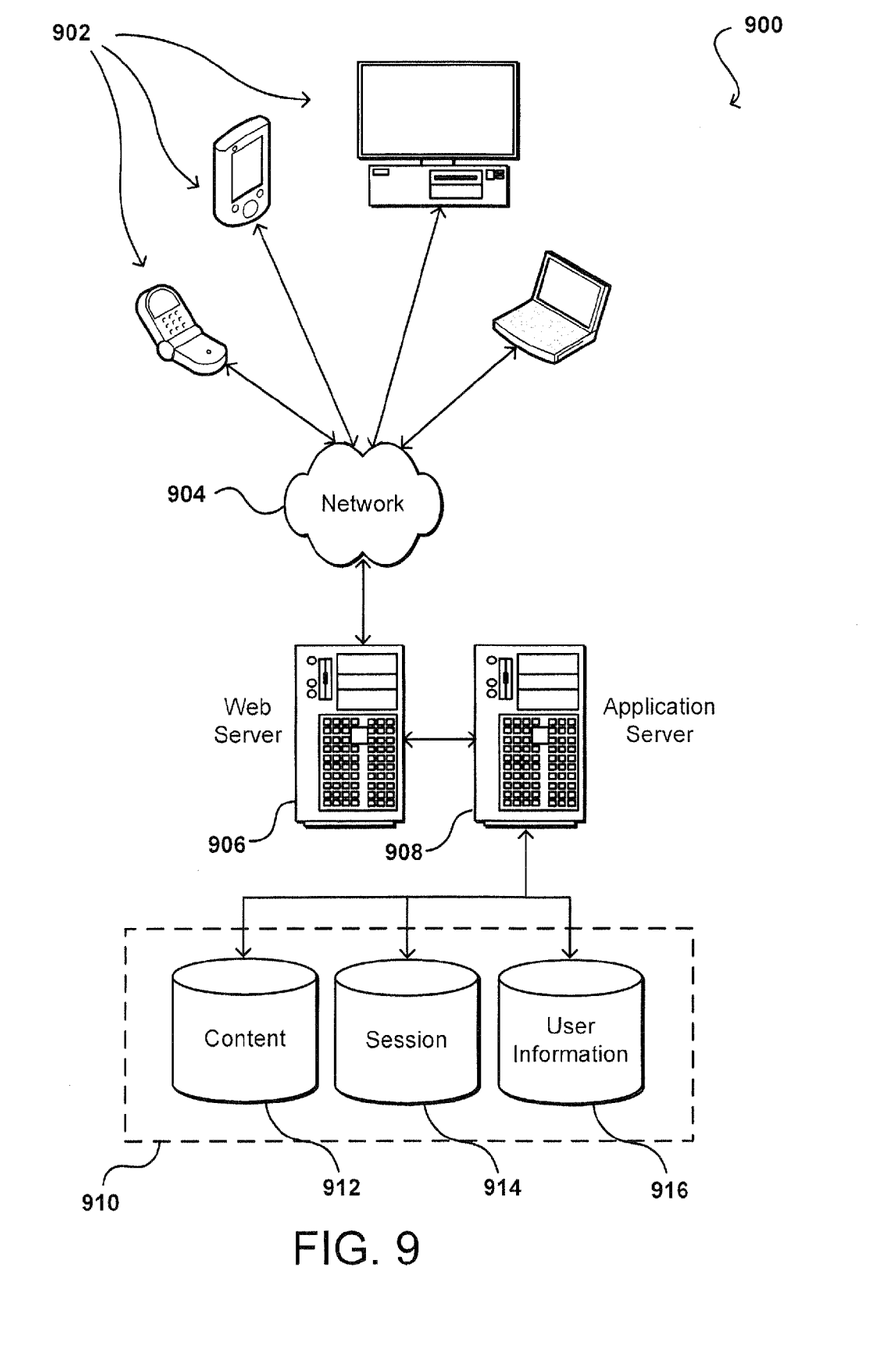
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for monitoring and sharing data in a data center environment, comprising:
    gathering data about at least one performance characteristic associated with a respective server in a plurality of servers in a server group;
    determining, at the respective server, that the data indicates that the at least one performance characteristic falls outside an allowable range;
    transmitting a broadcast from the respective server to other servers in the plurality of servers in the server group, the broadcast including the data about the at least one performance characteristic associated with the respective server;
    receiving, at the respective server, a quantity of broadcasts from one or more other servers in the server group, the quantity of broadcasts including data about at least one performance characteristic associated with the one or more other servers, the data indicating that the at least one performance characteristic associated with the one or more other servers also falls outside the allowable range;
    determining that the quantity of broadcasts from the one or more other servers exceeds an allowable threshold; and
    transmitting a message directed to a central controller, the message indicating a potential problem associated with at least one of the respective server or the one or more other servers in the server group.

2. The computer-implemented method of claim 1, further comprising:
    calculating a confidence score indicating that the potential problem is associated with the respective server, the calculating being based, at least in part, on the at least one performance characteristic associated with the respective server and the at least one performance characteristic associated with the one or more other servers.

3. The computer-implemented method of claim 2, further comprising:
  performing a level of memory scan at the respective server, the level of memory scan being based, at least in part, on at least one of the confidence level calculated or the quantity of broadcasts received.

4. The computer-implemented method of claim 1, wherein the plurality of servers in the server group includes servers on the same local subnet.

5. The computer-implemented method of claim 1, wherein the performance characteristic is a temperature measurement, and wherein the at least one performance characteristic falls outside the allowable range when the temperature measurement exceeds an allowable temperature threshold.

6. A computer-implemented method comprising:
  gathering performance data associated with a respective server in a plurality of servers in a server group;
  determining that the performance data indicates a potential problem associated with the respective server;
  transmitting at least an indication of the potential problem associated with the respective server to other servers in the plurality of servers in the server group;
  receiving, from one or more other servers in the server group, information indicating potential problems associated with the one or more other servers;
  determining that a threshold amount of information indicating potential problems has been received from the one or more other servers; and
  transmitting a message directed to a central controller, the message providing a notification of the potential problems associated with at least one of the respective server or the one or more other servers in the server group.

7. The computer-implemented method of claim 6, further comprising:
  calculating a confidence score indicating a likelihood that the potential problem is actually occurring at the respective server, the calculating being based, at least in part, on the performance data associated with the respective server and the information received from the one or more other servers.

8. The computer-implemented method of claim 6, further comprising:
  transmitting at least a portion of the performance data associated with the respective server to the other servers in the plurality of servers in the server group; and
  receiving, from the one or more other servers in the server group, performance data indicating potential problems associated with the one or more other servers.

9. The computer-implemented method of claim 6, further comprising:
  performing a level of diagnostic check at the respective server, the level of diagnostic check being based, at least in part, on the performance data associated with the respective server and the information received from the one or more other servers.

10. The computer-implemented method of claim 6, wherein the plurality of servers in the server group share a common property including at least one of being in the same local subnet, being physically located on the same server rack, being physically located within an allowable physical distance, being logically located within an allowable network distance, being of the same server model, being of the same server brand, being from the same vendor, having a common hardware component type, having a common hardware component model, having a common hardware component manufacturer, being positioned at a particular location on a server rack, being associated with the same power domain, being associated with a particular customer account, being associated with a particular workload, or being associated with a particular user defined property.

11. The computer-implemented method of claim 6, wherein the performance data includes at least one of a temperature measurement, a power performance metric, a reboot indication, or a unexpected bit flip indication.

12. The computer-implemented method of claim 11, wherein the performance data includes a temperature measurement, and wherein the performance data indicates the potential problem associated with the respective server when the temperature measurement at the respective server exceeds an allowable temperature threshold.

13. The computer-implemented method of claim 6, further comprising:
  determining, at the central controller, a likelihood that a potential problem is actually occurring with respect to the server group, the determining being based, at least in part, on the performance data associated with the respective server and the performance data associated with the one or more other servers.

14. The computer-implemented method of claim 6, further comprising:
  generating a visual representation of at least the plurality of servers in the server group, the visual representation including one or more visual elements that indicate the potential problem associated with the respective server and the potential problems associated with the one or more other servers.

15. A system comprising:
  at least one processor; and
  a memory device including instructions that, when executed by the at least one processor, cause the system to:
    gather performance data associated with a respective server in a plurality of servers in a server group;
    determine that the performance data indicates a potential problem associated with the respective server;
    transmit at least an indication of the potential problem associated with the respective server to other servers in the plurality of servers in the server group;
    receive, from one or more other servers in the server group, information indicating potential problems associated with the one or more other servers;
    determine that a threshold amount of information indicating potential problems has been received from the one or more other servers; and
    transmit a message directed to a central controller, the message providing a notification of the potential problems associated with at least one of the respective server or the one or more other servers in the server group.

16. The system of claim 15, further comprising:
  a switch associated with the server group, the switch being configured to relay the at least the indication of the potential problem associated with the respective server to other servers and to relay the information from the one or more other servers to the respective server.

17. The system of claim 16, wherein the switch is further configured to relay the message to the central controller.

18. The system of claim 16, wherein the switch is further configured to communicate, with one or more other switches associated with one or more other server groups, about the message.

19. The system of claim 16, wherein the plurality of servers in the server group includes a quantity of servers on a server rack, and wherein the switch is a top-of-rack switch for the server rack.

20. The system of claim 15, wherein the instructions cause the system to further determine, at the central controller, a likelihood that a potential problem is actually occurring with respect to the server group, the determining being based, at least in part, on the transmitted message.

21. The system of claim 15, wherein the central controller is further configured to notify at least one of a technician, a support department, a repair department, or a maintenance department, about the potential problems associated with the at least one of the respective server or the one or more other servers in the server group.

22. A non-transitory computer-readable storage medium including instructions, the instructions when executed by a processor of a computing system causing the computing system to:

gather performance data associated with a respective server in a plurality of servers in a server group;

determine that the performance data indicates a potential problem associated with the respective server;

transmit at least an indication of the potential problem associated with the respective server to other servers in the plurality of servers in the server group;

receive, from one or more other servers in the server group, information indicating potential problems associated with the one or more other servers;

determine that a threshold amount of information indicating potential problems has been received from the one or more other servers; and transmit a message directed to a central controller, the message providing a notification of the potential problems associated with at least one of the respective server or the one or more other servers in the server group.

23. The non-transitory computer-readable storage medium of claim 22, wherein the plurality of servers in the server group share a common property, the common property including at least one of being in the same local subnet, being physically located on the same server rack, being physically located within an allowable physical distance, being logically located within an allowable network distance, being of the same server model, being of the same server brand, being from the vendor, being positioned at a particular location on a server rack, being associated with the same power domain, being associated with a particular customer account, being associated with a particular workload, or being associated with a particular user defined property.

24. The non-transitory computer-readable storage medium of claim 22, wherein the instructions cause the computing system to further determine, at the central controller, an overall confidence score specifying a likelihood that a potential problem is actually occurring with respect to the server group, the determining being based, at least in part, on the performance data associated with the respective server and the information received from the one or more other servers.

25. The non-transitory computer-readable storage medium of claim 22, wherein the instructions cause the computing system to further generate a visual representation of at least the plurality of servers in the server group, the visual representation including one or more visual elements that indicate the potential problem associated with the respective server and the potential problems associated with the one or more other servers.

* * * * *